US012790892B2

(12) United States Patent
Fronek et al.

(10) Patent No.: US 12,790,892 B2
(45) Date of Patent: Nov. 10, 2026

(54) SCREENS FOR FENESTRATION UNITS WITH REDUCED CORROSION

(71) Applicant: Andersen Corporation, Bayport, MN (US)

(72) Inventors: Steven Fronek, Saint Paul, MN (US); Matthew Nelson, Lake Elmo, MN (US); Wade Luhman, Lino Lakes, MN (US); Duane Fier, Hudson, WI (US); Paul Sinz, Stillwater, MN (US)

(73) Assignee: Andersen Corporation, Bayport, MN (US)

( * ) Notice: Subject to any disclaimer, the term of this patent is extended or adjusted under 35 U.S.C. 154(b) by 303 days.

(21) Appl. No.: 18/243,476

(22) Filed: Sep. 7, 2023

(65) Prior Publication Data

US 2024/0175315 A1 May 30, 2024

Related U.S. Application Data

(60) Provisional application No. 63/405,216, filed on Sep. 9, 2022.

(51) Int. Cl.
*E06B 9/52* (2006.01)

(52) U.S. Cl.
CPC .................................... *E06B 9/52* (2013.01)

(58) Field of Classification Search
CPC ............................ E06B 2009/527; E06B 9/52
See application file for complete search history.

(56) References Cited

U.S. PATENT DOCUMENTS

| | | | | | |
|---|---|---|---|---|---|
| 77,228 | A * | 4/1868 | Watkins | E06B 9/52 | 160/380 |
| 1,171,951 | A * | 2/1916 | Higgin | E06B 9/52 | 160/381 |
| 1,171,952 | A * | 2/1916 | Higgin | E06B 9/52 | 160/381 |
| 1,187,402 | A * | 6/1916 | Traut | E06B 9/52 | 160/381 |
| 1,241,687 | A * | 10/1917 | Watson | E06B 9/52 | 160/43 |
| 1,245,044 | A * | 10/1917 | Scott | E06B 9/52 | 160/397 |
| 1,561,877 | A * | 11/1925 | Martin | E06B 9/52 | 160/381 |

(Continued)

FOREIGN PATENT DOCUMENTS

WO WO-2014039910 A1 * 3/2014 ............... E06B 1/36

*Primary Examiner* — Johnnie A. Shablack

(74) *Attorney, Agent, or Firm* — Pauly, DeVries Smith & Deffner LLC

(57) ABSTRACT

Embodiments herein relate to screen assemblies for fenestration units configured to reduce corrosion issues. In an embodiment, a screen assembly is included having a frame, the frame defining a spline channel; a mesh, the mesh can include a peripheral edge, wherein the peripheral edge is disposed within the spline channel; a spline, wherein the spline is fitted within the spline channel and holds the peripheral edge in place; and a polymeric barrier layer, wherein the polymeric barrier layer separates at least one of the mesh and the frame, the mesh and the spline, or the frame and the spline from electrical contact with one another. Other embodiments are also included herein.

20 Claims, 10 Drawing Sheets

(56) References Cited

U.S. PATENT DOCUMENTS 1,573,194 A * 2/1926 Roe ..... E06B 9/52 160/91
1,596,507 A * 8/1926 Otto ..... E06B 9/52 160/397
1,659,955 A * 2/1928 Loescher ..... E06B 9/52 160/DIG. 12
1,722,947 A * 7/1929 Schneider ..... E06B 9/52 160/381
1,737,944 A * 12/1929 Pollack ..... E06B 9/52 49/421
1,786,040 A * 12/1930 Taylor ..... E06B 9/52 160/369
1,798,187 A * 3/1931 Brouillette ..... E06B 9/52 160/376
1,827,382 A * 10/1931 Chamberlain, Jr. ..... E06B 9/52 160/381
1,866,882 A * 7/1932 Dixson ..... E06B 9/58 49/63
1,915,590 A * 6/1933 Bevans ..... E06B 9/52 49/417
1,940,055 A * 12/1933 Jorss ..... E06B 9/52 160/369
1,947,102 A * 2/1934 Pendery ..... E06B 9/52 160/40
2,126,544 A * 8/1938 Everhard ..... E06B 9/52 52/658
2,128,489 A * 8/1938 Lang ..... E06B 9/52 160/381
2,335,361 A * 11/1943 Schiller ..... E06B 9/52 160/395
2,378,163 A * 6/1945 Thomas ..... E06B 9/52 160/40
2,778,100 A * 1/1957 Lipman ..... E06B 9/52 101/415.1
2,784,781 A * 3/1957 Rhoades ..... E06B 9/52 160/397
2,784,782 A * 3/1957 Young ..... E06B 9/52 160/395
3,009,516 A * 11/1961 Albee, Jr. ..... E06B 9/52 160/381
3,371,702 A * 3/1968 Keegan ..... E06B 3/285 160/395
4,127,156 A * 11/1978 Brandt ..... E06B 9/01 160/369
4,311,183 A * 1/1982 Herbst ..... E06B 9/52 160/90
4,410,027 A * 10/1983 Lucous ..... E06B 3/285 160/395
4,472,862 A * 9/1984 Bloomfield ..... F16B 5/0692 160/395
4,731,960 A * 3/1988 Sease ..... A47B 96/061 52/273
4,899,797 A 2/1990 Green
5,046,546 A * 9/1991 Benedyk ..... E06B 9/521 160/371
5,431,211 A * 7/1995 Guillemet ..... E06B 9/52 403/231
5,666,773 A * 9/1997 Librande ..... B29C 66/73921 160/369
5,794,400 A * 8/1998 Fisher ..... E04F 10/02 52/63
6,170,555 B1 * 1/2001 Welfonder ..... E06B 9/52 160/381
6,279,644 B1 * 8/2001 Wylie ..... E06B 9/52 160/371
6,763,875 B2 7/2004 Gronlund et al.
6,880,612 B2 4/2005 Pylkki et al.
6,945,305 B1 9/2005 Limauro
7,195,053 B2 3/2007 Pylkki et al.
7,201,208 B2 4/2007 Pylkki et al.
7,537,043 B2 5/2009 Veivers et al.
8,042,598 B2 10/2011 Bredemus et al.
8,056,602 B1 * 11/2011 Green ..... E06B 9/52 160/395
8,146,647 B1 * 4/2012 Hughes ..... E06B 9/52 160/371
8,347,939 B2 1/2013 Brabeck et al.
8,869,871 B2 * 10/2014 Massey ..... E05B 63/18 160/269
8,887,793 B2 * 11/2014 Massey ..... E06B 3/26 160/369
9,163,454 B1 10/2015 Hopson
9,482,051 B1 * 11/2016 Green ..... E06B 5/00
9,631,423 B2 * 4/2017 Hornung ..... E06B 9/52
10,577,860 B2 * 3/2020 Seuberling ..... E06B 9/52
10,669,773 B2 * 6/2020 Grube ..... E06B 3/98
11,060,350 B2 * 7/2021 Randall ..... E06B 9/52
2003/0131954 A1 7/2003 Taylor et al.
2004/0140061 A1 * 7/2004 Woodward ..... E06B 3/302 160/92
2006/0219374 A1 * 10/2006 Mckinney ..... E04H 15/644 160/395
2011/0114268 A1 5/2011 Brabeck et al.
2011/0225887 A1 * 9/2011 Manier ..... E06B 9/52 49/56
2012/0073771 A1 3/2012 Dickison et al.
2013/0228296 A1 * 9/2013 Smith ..... E06B 9/52 292/164
2014/0130993 A1 * 5/2014 Zwar ..... E06B 9/52 160/371
2015/0233177 A1 * 8/2015 Marchand ..... E06B 1/36 49/506
2015/0267459 A1 9/2015 Sprague
2016/0273263 A1 9/2016 Farina et al.
2022/0268098 A1 * 8/2022 Allen ..... E06B 9/52
2023/0151688 A1 * 5/2023 Austin ..... E06B 9/52 160/371
2024/0200402 A1 * 6/2024 Green ..... E06B 3/99
2025/0129661 A1 * 4/2025 Hartford ..... E06B 3/9682
2025/0237107 A1 * 7/2025 Edlin ..... E06B 9/01
2025/0250854 A1 * 8/2025 Green ..... E06B 9/52

* cited by examiner

SCREENS FOR FENESTRATION UNITS WITH REDUCED CORROSION

This application claims the benefit of U.S. Provisional Application No. 63/405,216, filed Sep. 9, 2022, the content of which is herein incorporated by reference in its entirety.

FIELD

Embodiments herein relate to screen assemblies for fenestration units configured to reduce corrosion issues.

BACKGROUND

Screen assemblies are frequently used with fenestration units such as windows or doors that can be opened to allow for an open window while preventing the passage of insects. Typically, the screen assembly is configured to fit within a portion of a frame of the fenestration unit.

In some cases, screen assemblies that are installed with fenestration units can be formed with a metal that can corrode. The corrosion can result in an undesirable appearance and, in some cases, failure of the screen. Screen assemblies in harsh environments, such as coastal or highly industrial environments, may be especially at risk for corrosion.

SUMMARY

Embodiments herein relate to screen assemblies for fenestration units configured to reduce corrosion issues. In a first aspect, a screen assembly can be included having a frame. The frame can define a spline channel. The screen assembly can also include a mesh. The mesh can include a peripheral edge that can be disposed within the spline channel. The screen assembly can further include a spline, wherein the spline can be fitted within the spline channel and hold the peripheral edge in place. A polymeric barrier layer can also be included, wherein the polymeric barrier layer separates at least one of the mesh and the frame, the mesh and the spline, or the frame and the spline from electrical contact with one another.

In a second aspect, in addition to one or more of the preceding or following aspects, or in the alternative to some aspects, the polymeric barrier layer can be at least partially disposed within the spline channel.

In a third aspect, in addition to one or more of the preceding or following aspects, or in the alternative to some aspects, the polymeric barrier layer separates the frame from the mesh.

In a fourth aspect, in addition to one or more of the preceding or following aspects, or in the alternative to some aspects, the frame can include aluminum and a primer with strontium chromate.

In a fifth aspect, in addition to one or more of the preceding or following aspects, or in the alternative to some aspects, the polymeric barrier layer can be a coextrusion of polyvinylchloride to cap a portion of the frame thereby separating the frame from the mesh.

In a sixth aspect, in addition to one or more of the preceding or following aspects, or in the alternative to some aspects, the spline can include a polymer.

In a seventh aspect, in addition to one or more of the preceding or following aspects, or in the alternative to some aspects, the polymer can include at least one selected from the group consisting of acrylonitrile butadiene styrene (ABS), polyethylene (PE), and polyvinylchloride (PVC).

In an eighth aspect, in addition to one or more of the preceding or following aspects, or in the alternative to some aspects, can further include a latch assembly.

In a ninth aspect, in addition to one or more of the preceding or following aspects, or in the alternative to some aspects, the latch assembly can be stainless steel coated with an electrically inert material thereby separating the wing blade from the frame.

In a tenth aspect, in addition to one or more of the preceding or following aspects, or in the alternative to some aspects, the latch assembly can be stainless steel and encapsulated in a polymer.

In an eleventh aspect, in addition to one or more of the preceding or following aspects, or in the alternative to some aspects, the latch assembly can include aluminum.

In a twelfth aspect, in addition to one or more of the preceding or following aspects, or in the alternative to some aspects, the latch assembly can include stainless steel.

In a thirteenth aspect, in addition to one or more of the preceding or following aspects, or in the alternative to some aspects, can further include a second polymeric barrier layer, wherein the second polymeric barrier layer separates the latch assembly from the frame.

In a fourteenth aspect, in addition to one or more of the preceding or following aspects, or in the alternative to some aspects, the frame can include powder coated aluminum.

In a fifteenth aspect, in addition to one or more of the preceding or following aspects, or in the alternative to some aspects, the spline can include aluminum with a coextruded polymer.

In a sixteenth aspect, in addition to one or more of the preceding or following aspects, or in the alternative to some aspects, the polymeric barrier layer physically separates the frame from the mesh and the spline.

In a seventeenth aspect, in addition to one or more of the preceding or following aspects, or in the alternative to some aspects, the frame can include aluminum.

In an eighteenth aspect, in addition to one or more of the preceding or following aspects, or in the alternative to some aspects, the polymeric barrier layer can include a vinyl film wrap, wherein the vinyl film wrap can be at least partially disposed within the spline channel.

In a nineteenth aspect, in addition to one or more of the preceding or following aspects, or in the alternative to some aspects, the polymeric barrier layer can include a polymeric insert, wherein the polymeric insert can be at least partially disposed within the spline channel.

In a twentieth aspect, in addition to one or more of the preceding or following aspects, or in the alternative to some aspects, the polymeric insert can include polyvinyl chloride.

In a twenty-first aspect, in addition to one or more of the preceding or following aspects, or in the alternative to some aspects, the polymeric barrier layer can be a coextrusion of polyvinyl chloride and caps a portion of the frame.

In a twenty-second aspect, in addition to one or more of the preceding or following aspects, or in the alternative to some aspects, the polymeric barrier layer can be at least partially disposed within the spline channel and at least partially disposed outside of the spline channel.

In a twenty-third aspect, in addition to one or more of the preceding or following aspects, or in the alternative to some aspects, the mesh can be stainless steel.

In a twenty-fourth aspect, in addition to one or more of the preceding or following aspects, or in the alternative to some aspects, the mesh can be fiberglass.

In a twenty-fifth aspect, a screen assembly can be included having a frame, the frame defining a spline channel. The frame can include aluminum and a primer with strontium chromate. The screen assembly can also include a mesh. The mesh can include a peripheral edge portion. The peripheral edge portion can be at least partially disposed within the spline channel. The mesh can be stainless steel. The screen assembly can also include a spline. The spline can be fitted within the spline channel and hold the peripheral edge portion in place. The screen assembly can also include a polymeric barrier layer, wherein the polymeric barrier layer separates at least one of the mesh and the frame, the mesh and the spline, or the frame and the spline from electrical contact with one another. The screen assembly can also include a latch assembly, wherein the latch assembly can be stainless steel and encapsulated in a polymer.

In a twenty-sixth aspect, in addition to one or more of the preceding or following aspects, or in the alternative to some aspects, the polymeric barrier layer can be at least partially disposed within the spline channel.

In a twenty-seventh aspect, in addition to one or more of the preceding or following aspects, or in the alternative to some aspects, the polymeric barrier layer separates the frame from the mesh.

In a twenty-eighth aspect, in addition to one or more of the preceding or following aspects, or in the alternative to some aspects, the polymeric barrier layer can be a coextrusion of polyvinylchloride to cap a portion of the frame thereby separating the frame from the mesh.

In a twenty-ninth aspect, in addition to one or more of the preceding or following aspects, or in the alternative to some aspects, the polymeric barrier layer physically separates the frame from the mesh and the spline.

In a thirtieth aspect, in addition to one or more of the preceding or following aspects, or in the alternative to some aspects, the polymeric barrier layer can include a vinyl film wrap, wherein the vinyl film wrap can be at least partially disposed within the spline channel.

In a thirty-first aspect, in addition to one or more of the preceding or following aspects, or in the alternative to some aspects, the polymeric barrier layer can include a polymeric insert, wherein the polymeric insert can be at least partially disposed within the spline channel.

In a thirty-second aspect, in addition to one or more of the preceding or following aspects, or in the alternative to some aspects, the polymeric insert can include polyvinyl chloride.

In a thirty-third aspect, in addition to one or more of the preceding or following aspects, or in the alternative to some aspects, the polymeric barrier layer can be a coextrusion of polyvinyl chloride and caps a portion of the frame.

In a thirty-fourth aspect, in addition to one or more of the preceding or following aspects, or in the alternative to some aspects, the polymeric barrier layer can be at least partially disposed within the spline channel and at least partially disposed outside of the spline channel.

In a thirty-fifth aspect, in addition to one or more of the preceding or following aspects, or in the alternative to some aspects, can further include a second polymeric barrier layer, wherein the second polymeric barrier layer separates the latch assembly from the frame.

In a thirty-sixth aspect, in addition to one or more of the preceding or following aspects, or in the alternative to some aspects, the spline can include aluminum with a coextruded polymer disposed thereover.

In a thirty-seventh aspect, in addition to one or more of the preceding or following aspects, or in the alternative to some aspects, the spline can include a polymer.

In a thirty-eighth aspect, in addition to one or more of the preceding or following aspects, or in the alternative to some aspects, the polymer can include at least one selected from the group consisting of acrylonitrile butadiene styrene (ABS), polyethylene (PE), and polyvinylchloride (PVC).

In a thirty-ninth aspect, a screen assembly can be included having a frame, the frame defining a spline channel. The screen assembly can also include a mesh, the mesh can include a peripheral edge that can be disposed within the spline channel. The screen assembly can also include a spline, wherein the spline can be disposed within the spline channel and hold the peripheral edge in place. The spline can be formed of an electrically non-conductive adhesive.

In a fortieth aspect, in addition to one or more of the preceding or following aspects, or in the alternative to some aspects, the spline occupies at least 75% of the volume of the spline channel.

In a forty-first aspect, in addition to one or more of the preceding or following aspects, or in the alternative to some aspects, the spline physically separates the frame from the mesh.

In a forty-second aspect, in addition to one or more of the preceding or following aspects, or in the alternative to some aspects, the frame can include aluminum.

In a forty-third aspect, a screen assembly can be included having a frame defining a spline channel. The screen assembly can also include a mesh. The mesh can include a peripheral edge, wherein the peripheral edge can be disposed within the spline channel. The screen assembly can include a spline, wherein the spline can be fitted within the spline channel and hold the peripheral edge in place. The spline, the frame, and the mesh can all be formed of stainless steel.

In a forty-fourth aspect, a screen assembly can be included having a frame and the frame can include fiberglass. The frame can define a spline channel. The screen assembly can include a mesh. The mesh can include stainless steel and a peripheral edge. The peripheral edge can be disposed within the spline channel. The screen assembly can include a spline. The spline can include a polymer. The spline can be fitted within the spline channel and hold the peripheral edge in place.

In a forty-fifth aspect, in addition to one or more of the preceding or following aspects, or in the alternative to some aspects, the polymer can include at least one selected from the group consisting of acrylonitrile butadiene styrene (ABS), polyethylene (PE), and polyvinylchloride (PVC).

In a forty-sixth aspect, a screen assembly can be included having a glass or carbon fiber reinforced polymer frame. The glass or carbon fiber reinforced polymer frame can define a spline channel. The screen assembly can include a mesh. The mesh can include stainless steel and a peripheral edge. The peripheral edge can be disposed within the spline channel. The screen assembly can include a spline, the spline can include a polymer. The spline can be fitted within the spline channel and holds the peripheral edge in place.

In a forty-seventh aspect, in addition to one or more of the preceding or following aspects, or in the alternative to some aspects, the polymer can include at least one selected from the group consisting of acrylonitrile butadiene styrene (ABS), polyethylene (PE), and polyvinylchloride (PVC).

In a forty-eighth aspect, a screen assembly can be included having a frame. The frame can be formed of aluminum and define a spline channel. The screen assembly can also include a mesh. The mesh can include fiberglass. The mesh can have a peripheral edge. The peripheral edge can be disposed within the spline channel. The screen assembly can include a spline. The spline can include a polymer. The spline can be fitted within the spline channel and hold the peripheral edge in place.

In a forty-ninth aspect, in addition to one or more of the preceding or following aspects, or in the alternative to some aspects, the polymer can include at least one selected from the group consisting of acrylonitrile butadiene styrene (ABS), polyethylene (PE), and polyvinylchloride (PVC).

In a fiftieth aspect, in addition to one or more of the preceding or following aspects, or in the alternative to some aspects, the frame can further include a primer with strontium chromate.

In a fifty-first aspect, in addition to one or more of the preceding or following aspects, or in the alternative to some aspects, can further include a stainless steel latch coated with an electrically inert coating.

In a fifty-second aspect, in addition to one or more of the preceding or following aspects, or in the alternative to some aspects, can further include an aluminum latch with an anodized topcoat.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
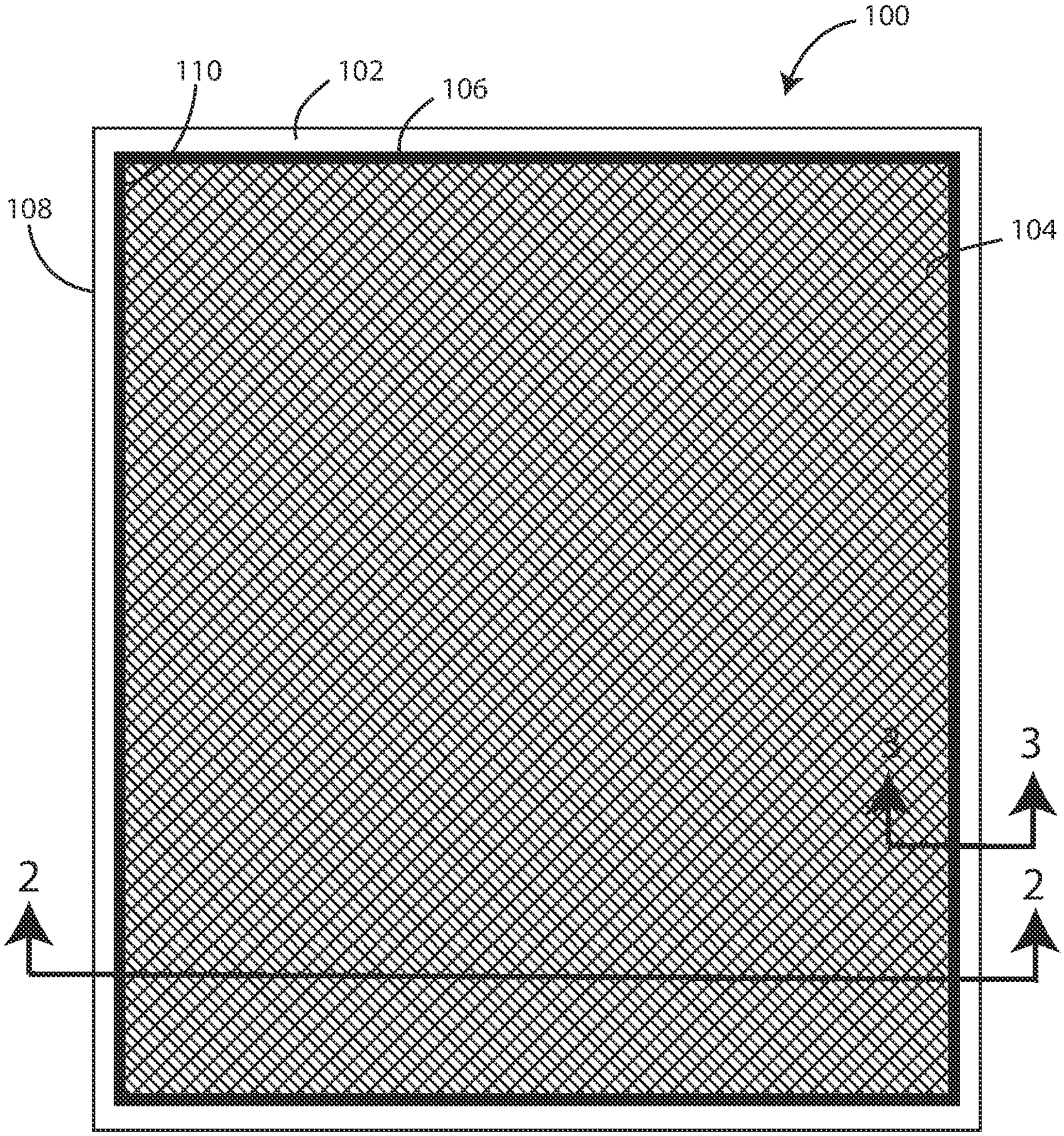
FIG. 1 is a front view of a screen assembly for a fenestration unit in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As described above, screen assemblies for fenestration units can sometimes be subject to corrosion. Corrosion can take various forms, such as galvanic corrosion, filiform corrosion, and natural corrosion. Corrosion can diminish or ruin the appearance and function of the screen assemblies.

Galvanic corrosion can occur when two dissimilar metals are in electrical contact with each other in the presence of an electrolyte. Many sources of water can carry sufficient dissolved content to facilitate galvanic corrosion but salt water and/or salt spray, such as that commonly found in coastal environments, can serve as a particularly effective electrolyte solution. Further, some highly industrial environments may result in slightly acidic precipitation that can also serve as an effective electrolyte solution.

However, various embodiments provided herein can protect against corrosion, such as by using similar metals and/or by isolating metals with inert barriers, such as polymeric barriers. Inert barriers can be used to prevent metal to metal electrical contact between dissimilar metals. For example, the use of inert materials as barriers and/or as entire components can eliminate dissimilar metal contact between a spline and a mesh, or between a spline and a frame. Further, in some embodiments, electrically isolating coatings can be applied to metal components. The coated metal components can be assembled together reducing corrosion.

Filiform corrosion may occur in corrosive environments where a coated or painted metal starts to corrode. Filiform corrosion may be decreased if the coated or painted metal is more well protected, such as with a primer containing hexavalent chromium. The chromium present in primer can further provide cathodic and anodic protection, as well as an additional physical barrier to a corrosive electrolyte.

Natural corrosion of the mesh, such as with a stainless-steel mesh, can be improved by using more corrosion resistant alloys or by increasing the performance of the protective coatings, such as by increasing thickness or changing to more durable materials.

Generally, screen assemblies herein can include a frame, a mesh, and a spline. The spline can retain a portion of the mesh within a channel defined by the frame, thereby connecting or coupling the mesh to the frame. Various embodiments provided herein include modifications to the frame, the spline, the mesh, and/or other metal components in the screen assemblies.

In some embodiments, the frame can include a coating or the addition of a primer, such as a chrome primer, such as to improve filiform corrosion resistance. In some embodiments, the frame can include a polymeric layer on the frame and/or within the channel, such as to improve galvanic corrosion resistance. In some embodiments, the polymeric layer can be applied over a painted frame. In some embodiments, the spline can include a non-metallic material, such as a polymer (including, but not limited to, polyvinyl chloride (PVC), acrylonitrile butadiene styrene (ABS), or acrylic) to eliminate an electrical connection and thereby reduce or eliminate galvanic corrosion. In some embodiments, stainless steel mesh with an increased paint thickness or an added coating can be included to provide corrosion resistance of the isolated mesh. In some embodiments, the mesh can include an alloy, such as 316 stainless steel to provide more corrosion resistance.

In various embodiments, the mesh can include an inert material, such as fiberglass, which can be less susceptible to certain types of corrosion. In some embodiments, other metal components, such as latches, can include a liquid, powder or polymer coating to eliminate galvanic connection. In some embodiments, a material can be used to eliminate a galvanic connection. Various corrosion resistance screen assemblies are described herein.

It should be understood that aspects of specific embodiments described herein, such as structures, materials, and configurations, can be combined with and/or exchanged with aspects of other embodiments described herein to provide corrosion resistance.

Referring now to FIG. 1, a front view of a screen assembly 100 is shown in accordance with various embodiments herein. FIG. 1 shows a screen assembly 100. The screen assembly 100 includes a frame 102. The screen assembly 100 also includes a mesh 104, sometimes referred to as a screen. The screen assembly 100 also includes a spline 106. The spline 106 can be inserted into a spline channel defined by the frame 102 to retain a portion of the mesh 104 within the spline channel thereby coupling or securing the mesh 104 to the frame 102.

The screen assembly 100, specifically the frame 102 can define an outer perimeter 108. In many embodiments, the outer perimeter 108 can be rectangular, such as shown in FIG. 1. However, it should be understood that the outer perimeter can take on other shapes as well depending on the opening the screen assembly is covering.

The screen assembly 100, specifically an inner portion of the frame 102, can define an inner opening 110. The inner opening 110 can be covered by the mesh 104. Air and light can pass through the inner opening 110 and the mesh 104.

Figure 2:
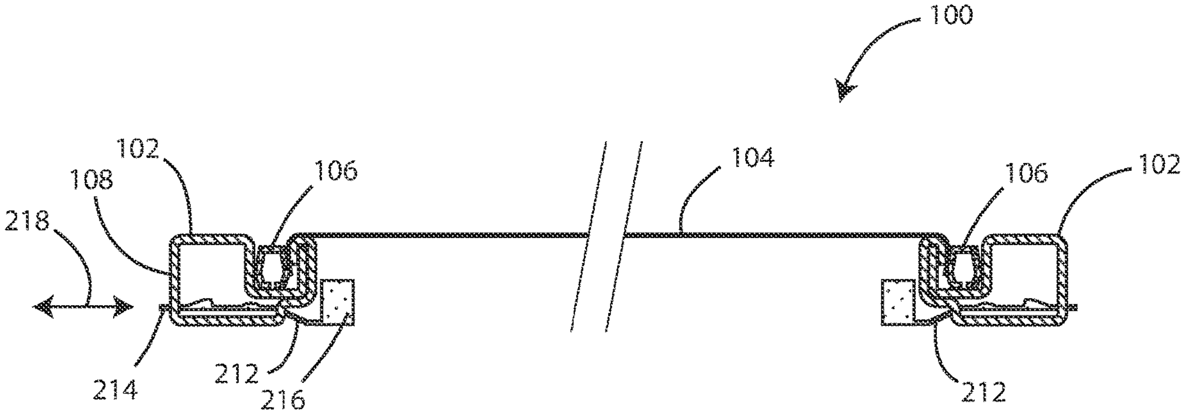
FIG. 2 is a cross-sectional view of the screen assembly in FIG. 1 in accordance with various embodiments herein.

Referring now to FIG. 2, a schematic cross-sectional view taken along line 2-2 in FIG. 1 of the screen assembly 100 is shown in accordance with various embodiments herein. The screen assembly 100 includes a frame 102. The screen assembly 100 also includes a mesh 104. The screen assembly 100 also includes a spline 106 disposed within a portion of the frame 102.

The screen assembly 100 can also include a latch assembly 212. The latch assembly 212 can used to secure the screen assembly in its desired location within an opening. The latch assembly 212 includes a projection or a wing blade 214. The wing blade can actuate in the direction of arrow 218. The wing blade 214 can retract within the frame 102, such as to allow the screen assembly 100 to be placed into its desired location. Once in the desired location, the wing blade 214 can be actuated and project out of the frame 102 beyond the outer perimeter 108 and into a recess defined by the surrounding structure defining the opening which the screen assembly is mounted within. The wing blade 214 disposed within the recess can lock or secure the screen assembly into place.

The latch assembly 212 can further include an control element 216, which can be used by an operator to actuate or retract the wing blade 214 in the direction of arrow 218. In some embodiments, the control element 216 can be in the form of a button, a lever, or a switch.

Figure 3:
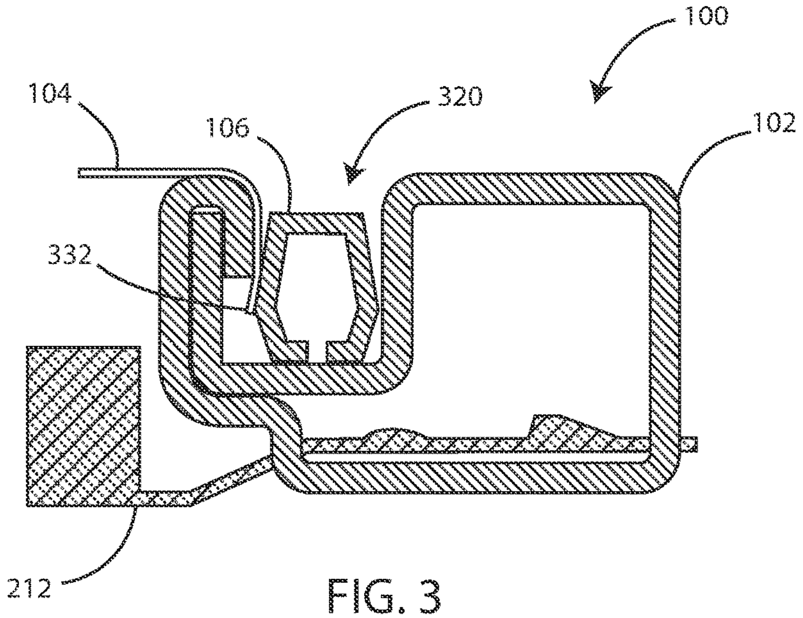
FIG. 3 is a cross-sectional vide of a portion of the screen assembly in FIG. 1 in accordance with various embodiments herein.

Referring now to FIG. 3, a cross-sectional view of a portion of the screen assembly 100 taken along line 3-3 in FIG. 1 is shown in accordance with various embodiments herein. The frame 102 can define a spline channel 320. The screen assembly 100 can include a mesh 104. The mesh 104 includes a peripheral edge 332. The peripheral edge 332 can be disposed within the spline channel 320. A spline 106 can be disposed within the spline channel 320 to retain the peripheral edge 332 within the spline channel 320 thereby securing the mesh 104 to the frame 102. The screen assembly 100 can also include a latch assembly 212.

As a particular example, the mesh 104 can be formed of stainless steel, the frame 102 can be formed of aluminum, the spline 106 can be formed of aluminum, and the latch assembly 212 can be formed of stainless steel. However, this example combination of metals in the arrangement shown in FIG. 3 can be susceptible to corrosion, especially galvanic corrosion in coastal environments, because the dissimilar metals are not electrically isolated from each other.

Figure 4:
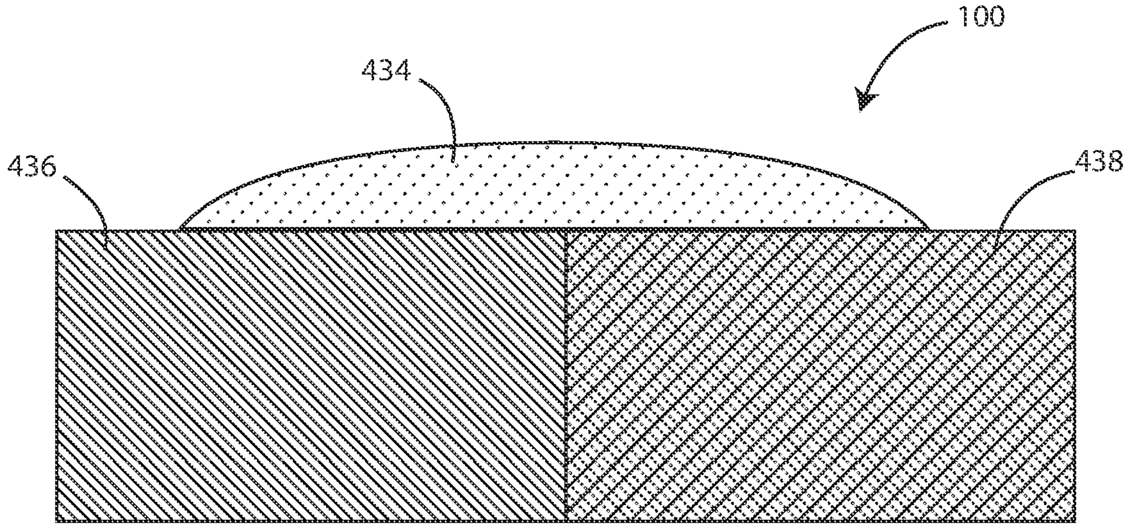
FIG. 4 is a schematic view is shown of two dissimilar metals in contact with one another.

Referring now to FIG. 4, a schematic view is shown of two dissimilar metals in contact with one another. This arrangement can be susceptible to corrosion. For example, one portion 436 can be formed of aluminum and can effectively serve as an anode. Another portion 438 can be formed of a ferrous metal such as a stainless steel and can effectively serve as a cathode. Then a liquid 434 can be in contact with both portions, such as a liquid serving as an electrolyte (which could be salt water, sea water or the like), and this can enable galvanic corrosion to occur. However, various embodiments described below provide protection against such corrosion.

Figure 5:
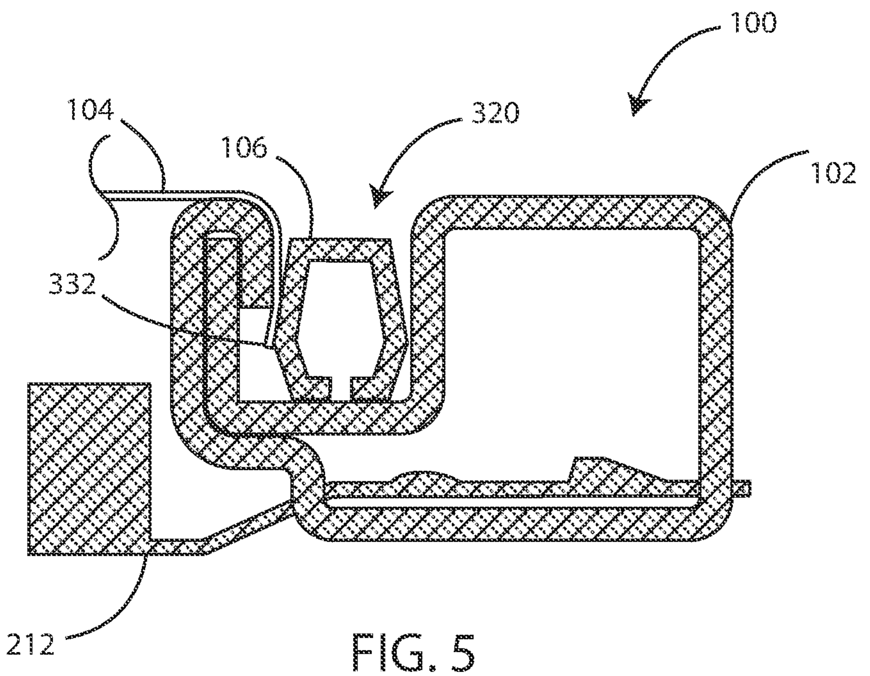
FIG. 5 is a cross-sectional view of a portion of a screen assembly in accordance with various embodiments herein.

Referring now to FIG. 5, a view cross-sectional view of a portion of a screen assembly is shown in accordance with various embodiments herein. A screen assembly includes a frame 102. The frame 102 can define a spline channel 320. The screen assembly also includes a mesh 104, with a peripheral edge 332 disposed within the spline channel 320. The screen assembly can include a spline 106 disposed within the spline channel 320 to retain the peripheral edge 332 within the spline channel 320.

In some embodiments, galvanic corrosion can be prevented by using similar metals throughout the screen assembly 100. For example, in various embodiments, the spline 106, the frame 102, and the mesh 104 can all be formed of stainless steel. Further, the latch assembly 212 can include stainless steel as well. Alternatively, all of the components can be formed of aluminum, or another metal. Regardless, galvanic corrosion can be prevented because the metal components are all similar metals. Even if the metal components contact each other, galvanic corrosion can be prevented because the same or similar metals are used.

In some embodiments, galvanic corrosion can be prevented by using one or more inert materials for one or more of the component parts. As an example, in some embodiments, the mesh 104 can include stainless steel, the frame 102 can include an inert material, such as fiberglass, and the spline 106 can include an inert material, such as a polymer, and the latch assembly 212 can include stainless steel. In such a configuration, galvanic corrosion can be prevented, because dissimilar metals are not included in the assembly and/or are not electrically connected with one another. In some embodiments, the spline 106 can be made from a polymer, such as acrylonitrile butadiene styrene (ABS), polyethylene (PE), polyvinyl chloride (PVC), or the like.

In some embodiments, the mesh 104 can include stainless steel, the frame 102 can include glass or carbon fiber reinforced polymer, the spline 106 can include a polymer, and the latch assembly 212 can include stainless steel. In some embodiments, the spline 106 can be made from a polymer, such as ABS, PE, PVC, or the like.

Figure 6:
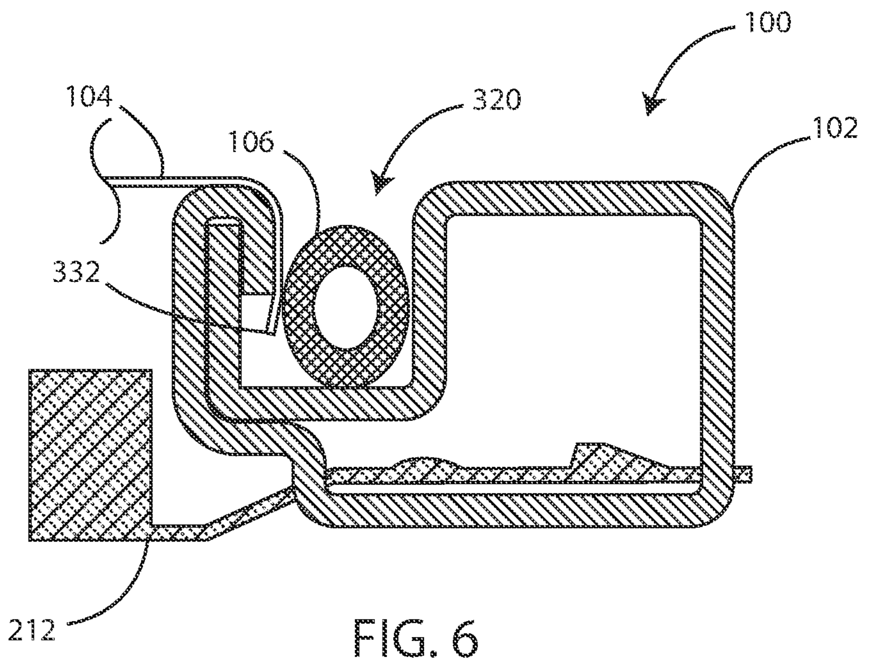
FIG. 6 is a cross-sectional view of a portion of a screen assembly in accordance with various embodiments herein.

Referring now to FIG. 6, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. In some embodiments, the primer can include strontium chromate. The mesh 104 can include fiberglass. The spline 106 can include a polymer, such as ABS, PE, or PVC. The latch assembly can include stainless steel. In some embodiments, the latch assembly (and/or other components) can be coated with an electrically inert (e.g., an electrical insulator) coating. One exemplary electrically inert coating is CERAKOTE™ electrical barrier ceramic coating, however various other polymer, ceramic, or composite electrically insulating coatings are contemplated herein.

Figure 7:
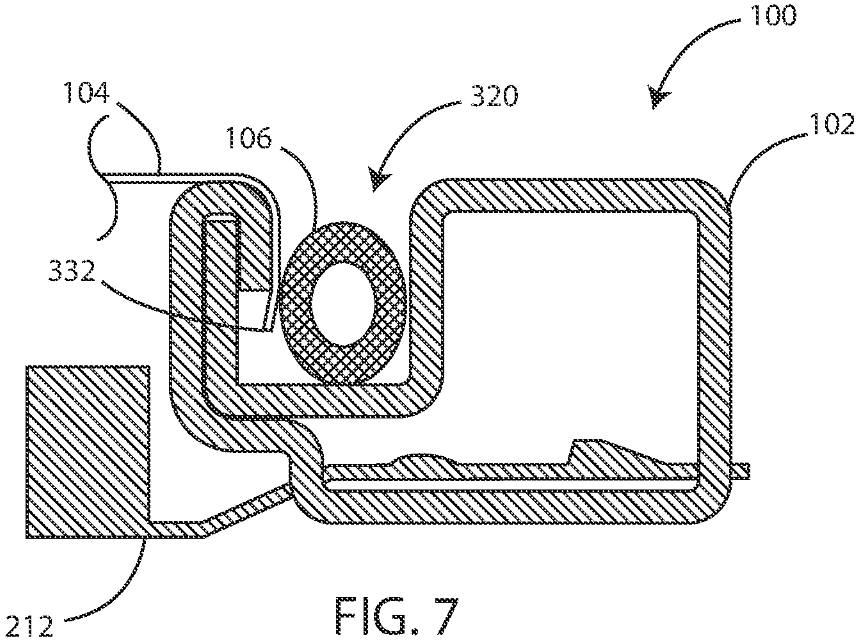
FIG. 7 is a cross-sectional view of a portion of a screen assembly in accordance with various embodiments herein.

Referring now to FIG. 7, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly 100 can further include a latch assembly 212.

In various embodiments, the frame 102 can include aluminum and a primer. The primer can include strontium chromate. The mesh 104 can include fiberglass. The spline 106 can include a polymer, such as ABS, PE, or PVC. The latch assembly can include aluminum, such as aluminum with an anodized topcoat.

Figure 8:
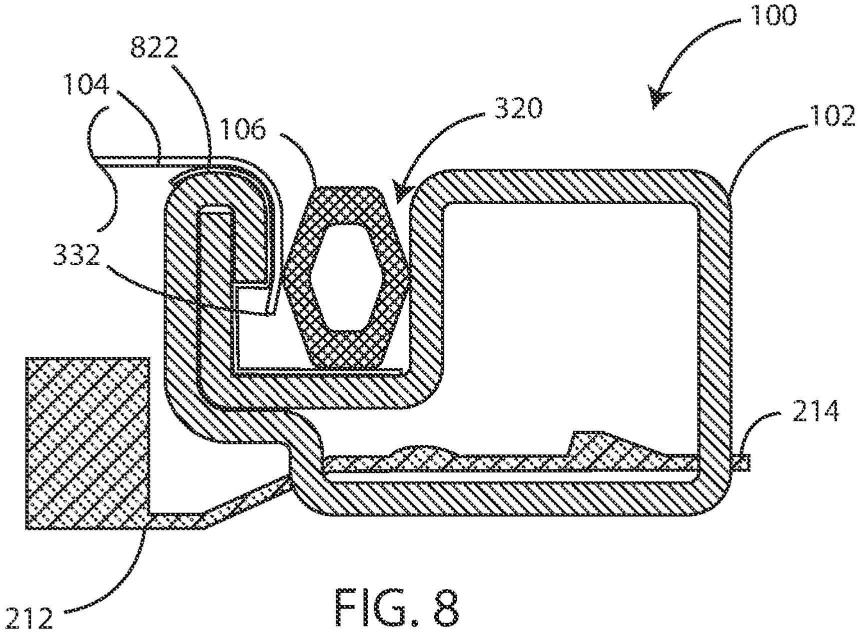
FIG. 8 is a cross-sectional view of a portion of a screen assembly in accordance with various embodiments herein.

Referring now to FIG. 8, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. The primer can include strontium chromate. The frame 102 can further include a polymeric barrier layer 822. The polymeric barrier layer 822 can be in the form of a coextrusion of a polymer, such as PVC, to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can separate the mesh 104 from the frame 102, such that the mesh 104 and the frame 102 do not contact each other. If the mesh 104 and the frame 102 are dissimilar metals, the polymeric barrier layer can prevent galvanic corrosion by separating the mesh 104 from the frame 102. In various embodiments, the polymeric barrier layer 822 can separate at least one of the mesh 104 and the frame 102, the mesh 104 and the spline 106, or the frame 102 and the spline 106 from electrical contact with one another.

The mesh 104 can include stainless steel. The spline 106 can include a polymer, such as ABS, PE, or PVC. The latch assembly can include stainless steel. The latch assembly can be coated with an electrically inert coating, such as CERAKOTE™. In various embodiments, a wing blade 214 of the latch assembly 212 and/or other components thereof can be stainless steel coated with an electrically inert material thereby separating the wing blade 214 and/or other components of the latch assembly 212 from the frame 102.

Figure 9:
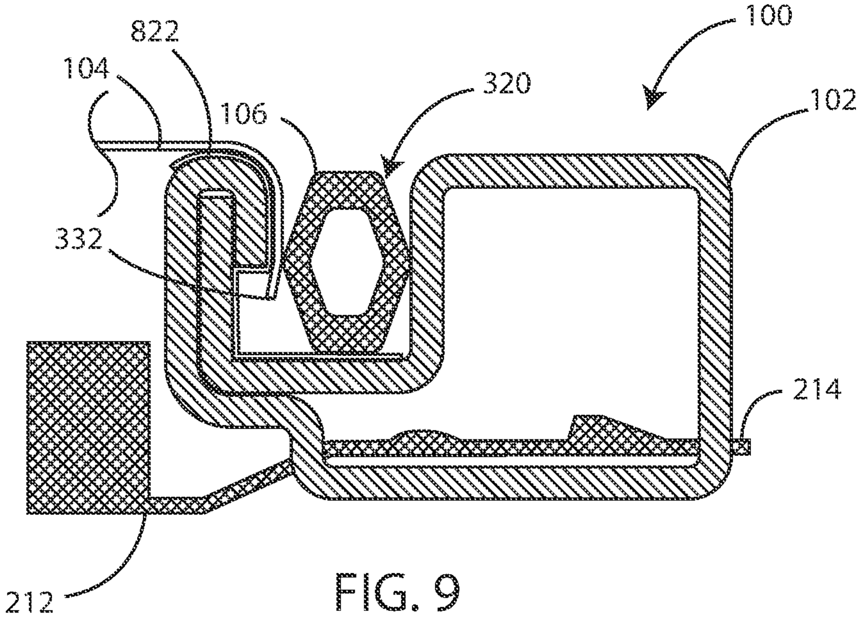
FIG. 9 is a cross-sectional view of a portion of a screen assembly in accordance with various embodiments herein.

Referring now to FIG. 9, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. The primer can include strontium chromate. In various embodiments, the frame 102 can include powder coated aluminum. The frame 102 can further include a polymeric barrier layer 822. The polymeric barrier layer 822 can be in the form of a coextrusion of a polymer, such as PVC, to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can separate the mesh 104 from the frame 102, such that the mesh 104 and the frame 102 do not contact each other.

The mesh 104 can include stainless steel. The spline 106 can include a polymer, such as ABS, PE, or PVC. The latch assembly 212 can include stainless steel. The latch assembly 212 can be encapsulated in a polymer via an overmold or using another technique. The wing blade 214 can be stainless steel and encapsulated in a polymer overmold thereby separating the stainless-steel wing blade 214 from the aluminum frame 102.

Figure 10:
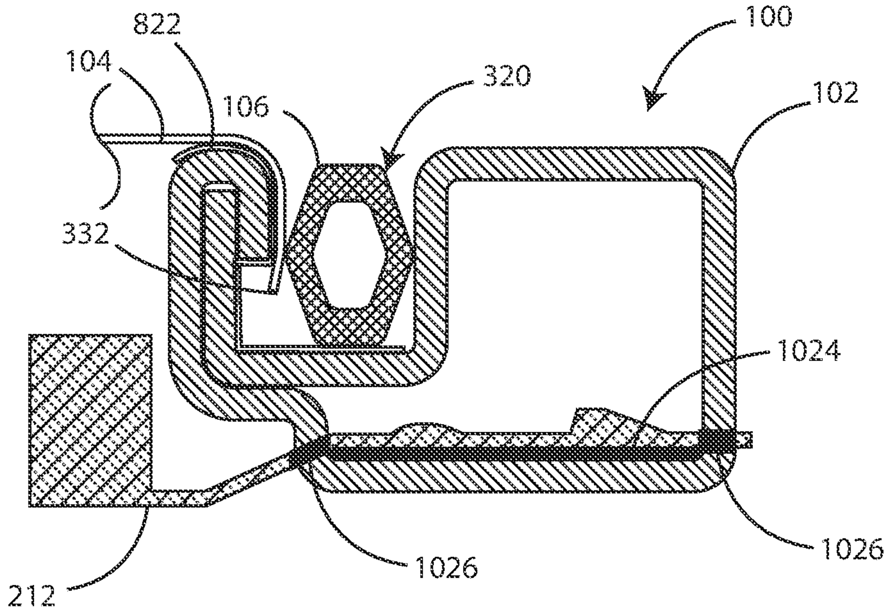
FIG. 10 is a cross-sectional view of a portion of a screen assembly in accordance with various embodiments herein.

Referring now to FIG. 10, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. The primer can include strontium chromate. In various embodiments, the frame 102 can include powder coated aluminum. The frame 102 can further include a polymeric barrier layer 822. The polymeric barrier layer 822 can be in the form of a coextrusion of a polymer, such as PVC, to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can separate the mesh 104 from the frame 102, such that the mesh 104 and the frame 102 do not contact each other.

The frame can further include a polymer insert 1024. The polymer insert 1024 can physically separate the latch assembly (and components thereof such as the wing blade) from the frame 102. The polymer insert 1024 can result in complete isolation of the latch assembly and components thereof such as a wing blade from the frame 102. The polymer insert 1024 can fit within slots 1026 in the frame to achieve such isolation. The polymer insert 1024 can prevent galvanic corrosion when the frame 102 and the latch assembly 212 are dissimilar metals, such as the frame being aluminum and the latch assembly 212 being stainless steel. The mesh 104 can include stainless steel. The spline 106 can include a polymer, such as ABS, PE, or PVC.

Figure 11:
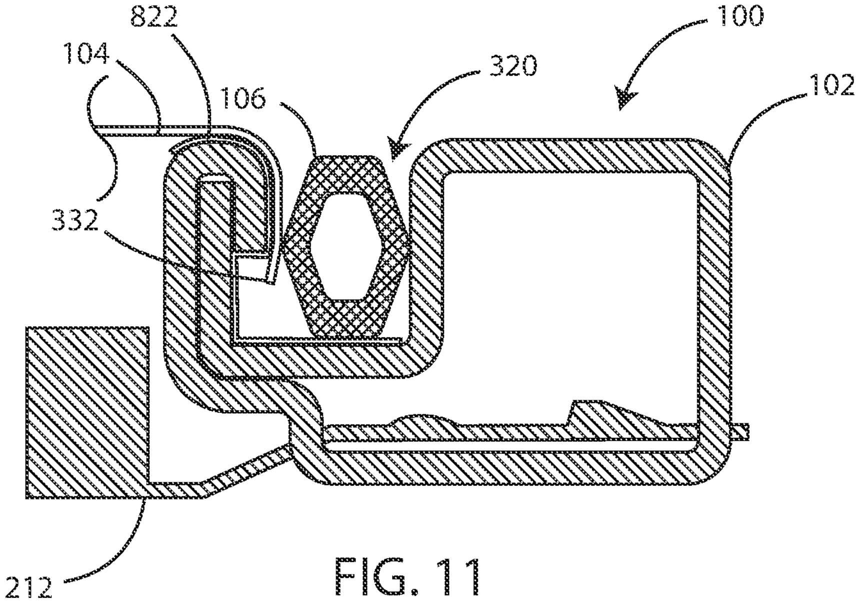
FIG. 11 is a cross-sectional view of a portion of a screen assembly in accordance with various embodiments herein.

Referring now to FIG. 11, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. The primer can include strontium chromate. The frame 102 can further include a polymeric barrier layer 822. The polymeric barrier layer 822 can be in the form of a coextrusion of a polymer, such as PVC, to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can separate the mesh 104 from the frame 102, such that the mesh 104 and the frame 102 do not contact each other. The mesh 104 can include stainless steel. The spline 106 can include a polymer, such as ABS, PE, or PVC. The latch assembly 212 can include aluminum, such as aluminum with an anodized topcoat.

Figure 12:
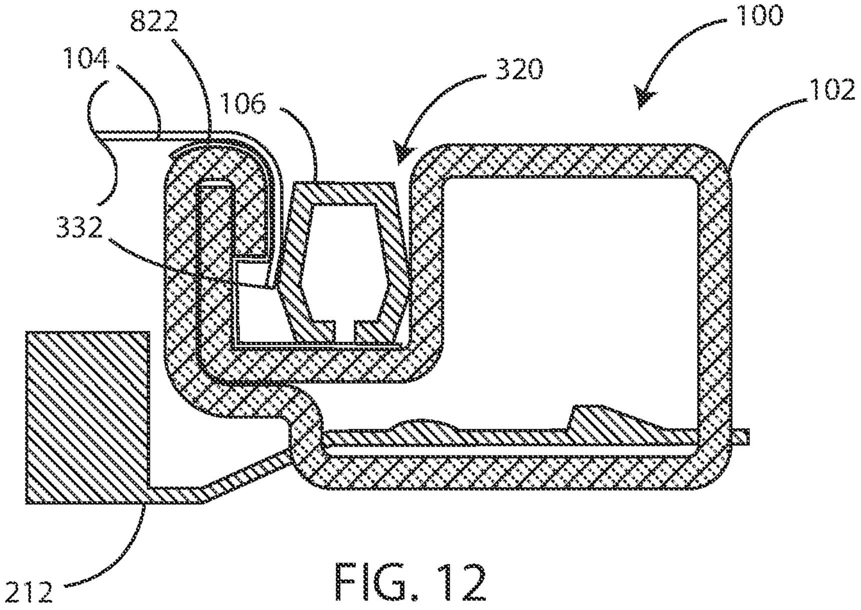
FIG. 12 is a cross-sectional view of a portion of a screen assembly in accordance with various embodiments herein.

Referring now to FIG. 12, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. The primer can include strontium chromate. The frame 102 can further include a polymeric barrier layer 822. The polymeric barrier layer 822 can be in the form of a coextrusion of a polymer, such as PVC, to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can separate the mesh 104 from the frame 102, such that the mesh 104 and the frame 102 do not contact each other.

The mesh 104 can include stainless steel. The spline 106 can include aluminum with a coextruded polymer thereover, such as PVC or another polymer, to physically separate the mesh 104 from the aluminum in the spline 106. The latch assembly 212 can include aluminum, such as aluminum with an anodized topcoat.

Figure 13:
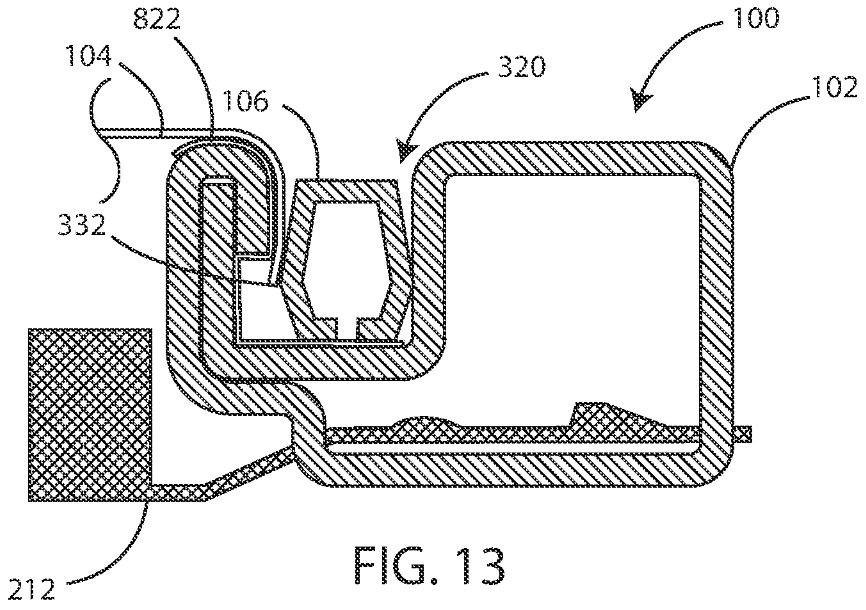
FIG. 13 is a cross-sectional view of a portion of a screen assembly in accordance with various embodiments herein.

Referring now to FIG. 13, a view of a portion of a screen assembly 100 is shown in accordance with various embodiments herein. As before, the screen assembly 100 includes a frame 102 and the frame 102 defines a spline channel 320. The screen assembly also includes a mesh 104 with a peripheral edge 332 disposed within the spline channel 320. The screen assembly also includes a spline 106 that can be fitted within the spline channel 320, such as to hold the peripheral edge 332 in place within the spline channel 320. The screen assembly can further include a latch assembly 212.

As with the embodiment of FIG. 12, the frame 102 can include aluminum and a primer (such as strontium chromate or another compound). The frame 102 can further include a polymeric barrier layer 822. The polymeric barrier layer 822 can be in the form of a coextrusion of a polymer, such as PVC, to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can separate the mesh 104 from the frame 102, such that the mesh 104 and the frame 102 do not contact each other. The mesh 104 can be formed of stainless steel. The spline 106 can include aluminum with a coextruded polymer thereover, such as PVC or another polymer, to physically separate the mesh 104 from the aluminum in the spline 106.

However, in the embodiment of FIG. 13, the latch assembly 212 (and components thereof such as a wing blade) can be formed of stainless steel that is encapsulated fully or partially in a polymer via an overmold or using another technique or otherwise coated thereby separating the stainless-steel latch assembly 212 from the aluminum frame 102. In some embodiments, the stainless steel latch assembly 212 can be coated with a primer material such as strontium chromate or the like (in addition to or in place of the polymer encapsulation). In some embodiments, the latch assembly 212 (and/or other components thereof) can be coated with an electrically inert (e.g., an electrical insulator) coating. One exemplary electrically inert coating is CERAKOTE™ electrical barrier ceramic coating, however various other polymer, ceramic, or composite electrically insulating coatings are contemplated herein.

Figure 14:
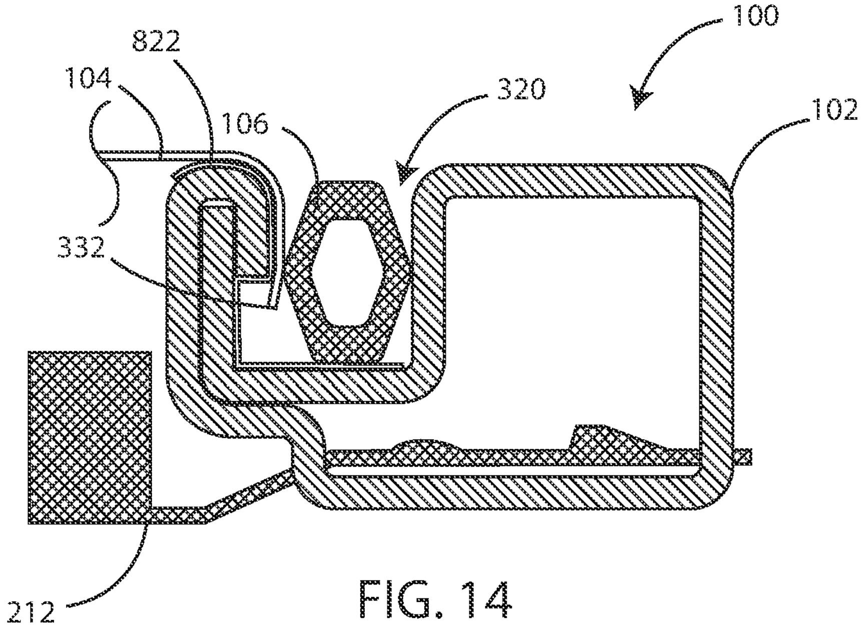
FIG. 14 is a cross-sectional view of a portion of a screen assembly in accordance with various embodiments herein.

Referring now to FIG. 14, a view of a portion of a screen assembly 100 is shown in accordance with various embodiments herein. The embodiment of FIG. 14 is generally similar to that of FIG. 13. However, in FIG. 14 the spline 106 is formed of a polymeric material, such as a polymeric material described herein.

Figure 15:
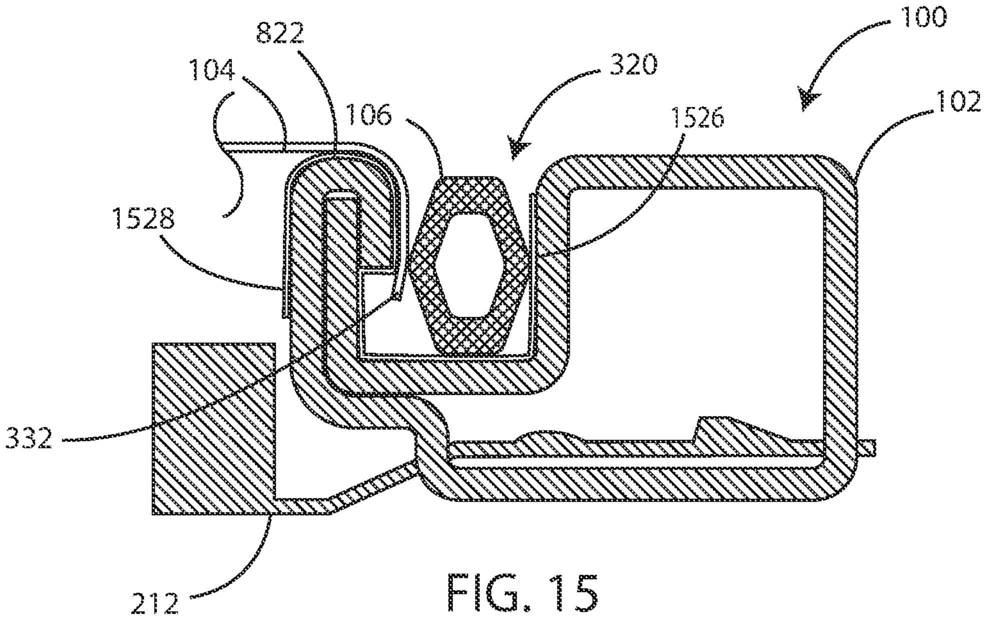
FIG. 15 is a cross-sectional view of a portion of a screen assembly in accordance with various embodiments herein.

Referring now to FIG. 15, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. The primer can include strontium chromate. The frame 102 can further include a polymeric barrier layer 822. The polymeric barrier layer 822 can be in the form of a vinyl film wrap, such as to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can cover or extend across an outer portion 1526 of the spline channel 320. In various embodiments, the polymeric barrier layer 822 can cover or extend across an inner portion 1528 of the frame 102. In various embodiments, the polymeric barrier layer 822 can extend from an inner portion 1528 of the frame 102 through the spline channel 320 to an outer portion 1526 of the spline channel 320.

In various embodiments, the polymeric barrier layer 822 can separate the mesh 104 from the frame 102, such that the mesh 104 and the frame 102 do not contact each other. In various embodiments, the polymeric barrier layer 822 can separate the spline 106 from the frame 102, such that the spline 106 and the frame 102 do not contact each other.

The mesh 104 can include stainless steel. The spline 106 can include a polymer, such as ABS, PE, or PVC. The latch assembly 212 can include aluminum, such as aluminum with an anodized topcoat.

Figure 16:
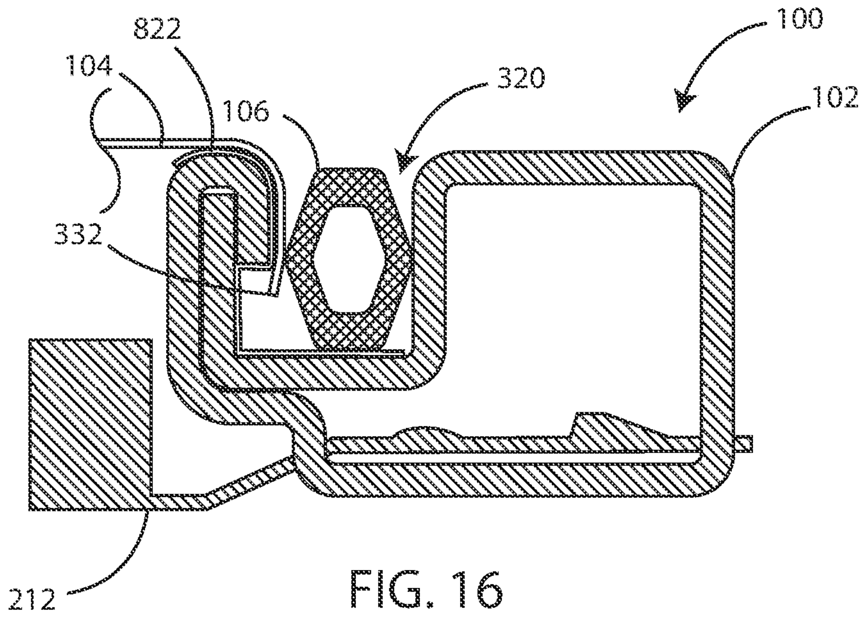
FIG. 16 is a cross-sectional view of a portion of a screen assembly in accordance with various embodiments herein.

Referring now to FIG. 16, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a primer. The primer can include strontium chromate. The frame 102 can further include a polymeric barrier layer 822. The polymeric barrier layer 822 can be in the form of a polymer insert, such as PVC. The polymer insert can be configured to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can separate the mesh 104 from the frame 102, such that the mesh 104 and the frame 102 do not contact each other.

The mesh 104 can include stainless steel. The spline 106 can include a polymer, such as ABS, PE, or PVC. The latch assembly 212 can include aluminum, such as aluminum with an anodized topcoat.

Figure 17:
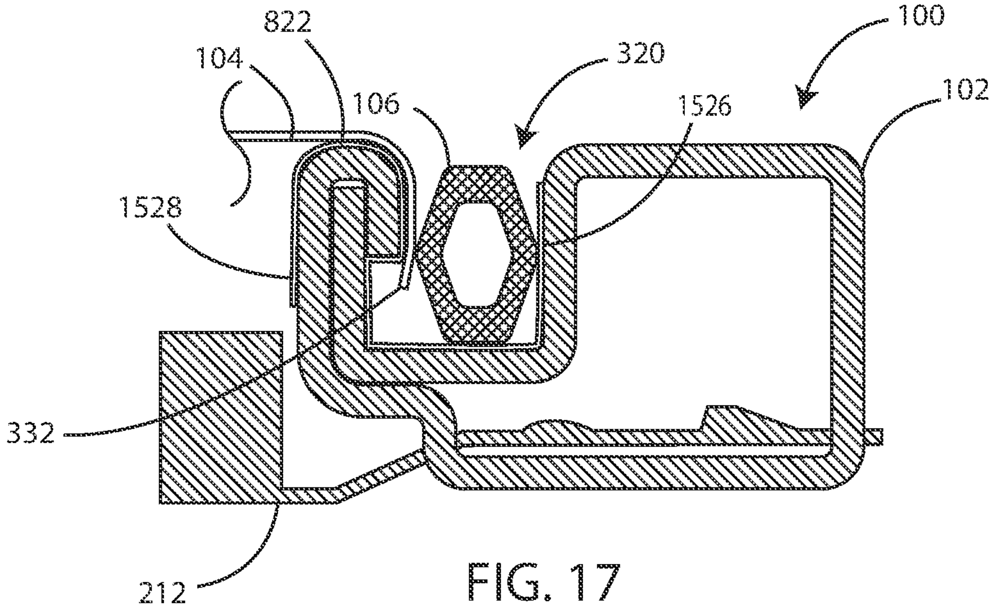
FIG. 17 is a cross-sectional view of a portion of a screen assembly in accordance with various embodiments herein.

Referring now to FIG. 17, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 disposed within the spline channel 320. The screen assembly also includes a spline 106. The spline 106 can be fitted within the spline channel 320, such as to hold the peripheral edge 332 in place within the spline channel 320. The screen assembly can further include a latch assembly 212.

In various embodiments, the frame 102 can include aluminum and a powder coat. The powder coat can insulate the frame 102 to protect contact with dissimilar metals. The frame 102 can further include a polymeric barrier layer 822. The polymeric barrier layer 822 can be in the form of a polymer insert, such as PVC. The polymer insert can be configured to cap or cover a portion of the frame 102. In various embodiments, the polymeric barrier layer 822 can be at least partially disposed in the spline channel 320, such as to cover a portion of the spline channel 320. In various embodiments, the polymeric barrier layer 822 can extend across or cover a portion of the inner portion 1528 of the frame 102. In various embodiments, the polymeric barrier layer 822 can separate the mesh 104 from the frame 102, such that the mesh 104 and the frame 102 do not contact each other.

The mesh 104 can include stainless steel. The spline 106 can include a polymer, such as ABS, PE, or PVC. The latch assembly 212 can include aluminum, such as aluminum with an anodized topcoat.

Figure 18:
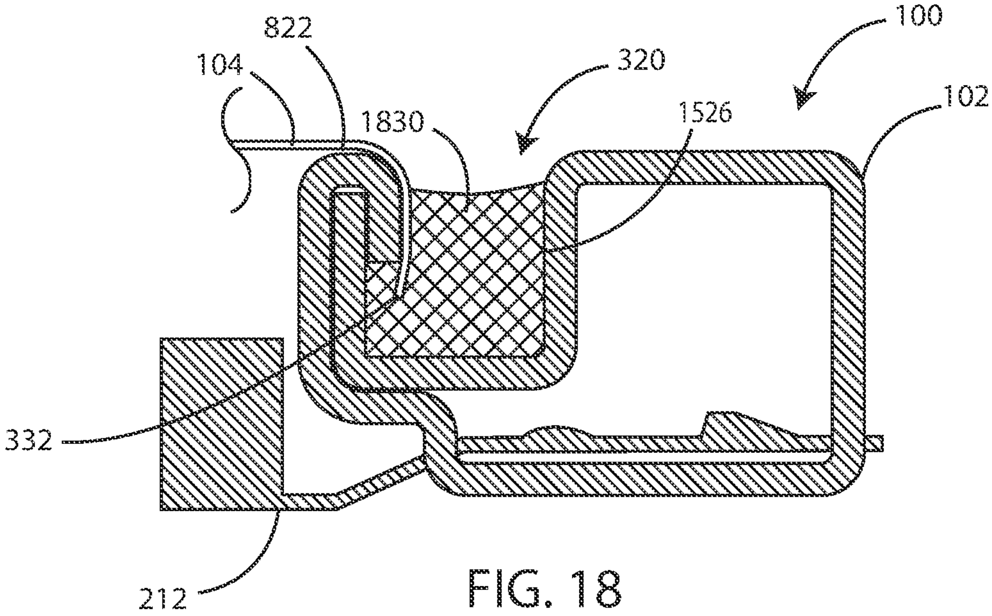
FIG. 18 is a cross-sectional view of a portion of a screen assembly in accordance with various embodiments herein.

Referring now to FIG. 18, a view of a portion of a screen assembly 100 is shown in accordance with various embodiments herein. A screen assembly 100 includes a frame 102. The frame 102 defines a spline channel 320. The screen assembly also includes a mesh 104 with a peripheral edge 332 (not shown in this view) disposed within the spline channel 320. The screen assembly also includes a spline, such as an adhesive spline 1830 or formed-in-place spline. In various embodiments, the spline 106 occupies at least about 30, 40, 50, 60, 70, 75, 80, 85, 90, 95, or 98% of the volume of the spline 106 channel, or an amount falling within a range between any of the foregoing. The adhesive spline 1830 can secure the peripheral edge 332 within the spline channel 320, such as to hold the peripheral edge 332 in place within the spline channel 320. The adhesive spline 1830 can be formed of various compositions, such as various polymeric compositions and sealants, and can be deposited in a flowable form in some embodiments and then allowed to cure. The screen assembly can further include a latch assembly 212.

In various embodiments, the frame 102 can include aluminum. The mesh 104 can include stainless steel. The spline 1830 can include an adhesive or sealant to secure the mesh 104 to the frame 102. In some embodiments, the adhesive spline 1830 an include an electrically non-conductive adhesive. The latch assembly 212 can include aluminum, such as aluminum with an anodized topcoat.

The mesh of embodiments herein can include a series of threads or elongated strips arranged in a grid pattern. The mesh can allow for the passage of air and light, but stop other elements, such as insects or leaves from passing through.

Mesh materials can include glass fibers, metals or polymers meet the requirements for screen element strength at the desired diameters, such as steel, stainless steel, aluminum, aluminum alloy, polyethylene, ultra high molecular weight polyethylene, polyester, modified nylon, polyamide, polyaramid, and aramid. In some embodiments, the mesh can include stainless steel or another metal. In some embodiments, the mesh can include fiberglass. Diameters of the elements making up the mesh can vary. In some embodiments, the diameter can be about 0.016, 0.011, 0.009, or 0.004 inches, or greater than or less than any of those diameters, or a diameter falling within a range between any of the foregoing.

In some embodiments, the mesh may include a coating or finish thereon. For example, the mesh can include a dark, non-reflective, and preferably dull or matte finish thereon. A dark non-reflective, dull or matte finish is defined herein to mean a finish that absorbs a sufficient amount of light such that the mesh appears less obtrusive than a mesh without such finish. The dark non-reflective or matte finish may be any color that absorbs a substantial amount of light, such as, for example, a black color. The dark non-reflective or matte finish can be applied to the mesh surface by any means available such as, for example, physical vapor deposition, electroplating, anodizing, liquid coating, ion deposition, plasma deposition, vapor deposition, and the like. Liquid coating may be, for example, paint, ink, and the like.

In some embodiments, the frame can define the shape of the screen assembly. The frame can provide a base for the other elements to be coupled to. In some embodiments, the frame is configured to provide structural support and rigidity for the screen assembly.

In some embodiments, the frame can include aluminum. In some embodiments, the frame can include aluminum with a primer. In some embodiments, the primer can include strontium chromate. In some embodiments, the frame can include aluminum with a primer and coextrusion of polymer. In some embodiments, the frame can include powder coated aluminum. In some embodiments, the frame can include powder coated aluminum and a coextrusion of polymer. In some embodiments, the frame can include aluminum with a primer and a vinyl film wrap. In some embodiments, the frame can include aluminum with a primer and a polymer insert. In some embodiments, the frame can include stainless steel. In some embodiments, the frame can include fiberglass. In some embodiments, the frame can include a glass or carbon fiber reinforced polymer.

In various embodiments, the spline together with the frame can be configured to provide a mechanical or compression coupling to retain the mesh within a portion of the frame. In some embodiments, the spline can be elastically flexible or compressible, such as to fit through a small gap defined in the frame. Once inside the desired location in the frame, the spline can expand to its original size within a larger opening defined by the frame to secure the spline within the frame.

In some embodiments, the spline can include aluminum. In some embodiments, the spline can include stainless steel. In some embodiments, the spline can include another metal. In some embodiments, the spline can include a polymer, such as ABS, PE, PVC, or the like. In some embodiments, the spline can include aluminum with a coextruded polymer. In some embodiments, the spline can be formed in place and include an adhesive or sealant.

In various embodiments, the spline can have various different cross-sectional shapes. In some embodiments, the spline can have a hexagonal cross-sectional shape, such as shown in FIG. 17. In some embodiments, the spline can have a substantially circular cross-sectional shape, such as shown in FIG. 6. In some embodiments, the spline can have a cross-sectional shape with an open channel, such as shown in FIG. 12. Various different spline shapes can be used depending on the related geometry of the portion of the frame that defines the spline channel and the peripheral edge of the mesh.

In some embodiments, additional components can be included in the screen assembly. In some embodiments, the screen assembly can include a latch assembly to secure the screen assembly in its desired location. In some embodiments, the latch assembly can include a wing blade. The wing blade can actuate to between a non-locking position and a locking position.

In some embodiments, the latch assembly and/or the wing blade can include stainless steel. In some embodiments, the latch assembly and/or the wing blade can include stainless steel coated with an electrically inert coating, such as CERAKOTE™. In some embodiments, the latch assembly and/or the wing blade can include aluminum. In some embodiments, the latch assembly and/or the wing blade can include aluminum with an anodized topcoat. In some embodiments, the latch assembly and/or the wing blade can include stainless steel encapsulated in a polymer via an overmold or using another technique. In some embodiments, the latch assembly and/or the wing blade can include stainless steel with a polymer insert that physically isolates or separates the latch assembly and/or the wing blade from the frame.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A screen assembly comprising:

a frame, the frame defining a spline channel, the frame defining an inner opening;

a mesh, the mesh comprising a peripheral edge, wherein the peripheral edge is disposed within the spline channel;

a spline, wherein the spline is fitted within the spline channel and holds the peripheral edge in place; and a polymeric barrier layer, wherein the polymeric barrier layer separates at least one of the mesh and the frame, the mesh and the spline, or the frame and the spline from electrical contact with one another, wherein the spline is located distally from the mesh relative to the inner opening.

2. The screen assembly of claim 1, wherein the polymeric barrier layer is at least partially disposed within the spline channel.

3. The screen assembly of claim 1, wherein the polymeric barrier layer separates the frame from the mesh.

4. The screen assembly of claim 1, the frame comprising aluminum and a primer with strontium chromate.

5. The screen assembly of claim 1, wherein the polymeric barrier layer is a coextrusion of polyvinylchloride to cap a portion of the frame thereby separating the frame from the mesh.

6. The screen assembly of claim 1, the frame comprising powder coated aluminum.

7. The screen assembly of claim 1, the spline comprising aluminum with a coextruded polymer.

8. The screen assembly of claim 1, wherein the polymeric barrier layer physically separates the frame from the mesh and the spline.

9. The screen assembly of claim 1, the frame comprising aluminum.

10. The screen assembly of claim 1, the polymeric barrier layer comprising a vinyl film wrap, wherein the vinyl film wrap is at least partially disposed within the spline channel.

11. The screen assembly of claim 1, the polymeric barrier layer comprising a polymeric insert, wherein the polymeric insert is at least partially disposed within the spline channel.

12. The screen assembly of claim 1, wherein the mesh is fiberglass.

13. The screen assembly of claim 1, further comprising a latch assembly.

14. The screen assembly of claim 13, wherein the latch assembly comprises a wing blade, wherein the latch assembly is stainless steel coated with an electrically inert material thereby separating the wing blade from the frame.

15. The screen assembly of claim 13, wherein the latch assembly is stainless steel and encapsulated in a polymer.

16. The screen assembly of claim 13, further comprising a second polymeric barrier layer, wherein the second polymeric barrier layer separates the latch assembly from the frame.

17. The screen assembly of claim 1, wherein the polymeric barrier layer is a coextrusion of polyvinyl chloride and caps a portion of the frame.

18. The screen assembly of claim 17, wherein the polymeric barrier layer is at least partially disposed within the spline channel and at least partially disposed outside of the spline channel.

19. A screen assembly comprising:

a frame;

the frame defining a spline channel, the frame defining an inner opening; and the frame comprising aluminum and a primer with strontium chromate;

a mesh, the mesh comprising a peripheral edge portion, wherein the peripheral edge portion is at least partially disposed within the spline channel;

wherein the mesh is stainless steel;

a spline, wherein the spline is fitted within the spline channel and holds the peripheral edge portion in place;

a polymeric barrier layer, wherein the polymeric barrier layer separates at least one of the mesh and the frame, the mesh and the spline, or the frame and the spline from electrical contact with one another; and a latch assembly, wherein the latch assembly is stainless steel and encapsulated in a polymer, wherein the spline is located distally from the mesh relative to the inner opening.

20. A screen assembly comprising:

a frame, the frame defining a spline channel;

a mesh, the mesh comprising a peripheral edge, wherein the peripheral edge is disposed within the spline channel;

a spline, wherein the spline is fitted within the spline channel and holds the peripheral edge in place; and a polymeric barrier layer, wherein the polymeric barrier layer is disposed on the frame within the spline channel, wherein the polymeric barrier layer separates the frame and the spline from electrical contact with one another or the polymeric barrier layer separates the mesh and the spline from electrical contact with one another.

* * * * *